(12) United States Patent
Hu

(10) Patent No.: US 9,224,998 B2
(45) Date of Patent: Dec. 29, 2015

(54) RECHARGEABLE BATTERY FOR REPLACING DRY BATTERY AND ITS STRUCTURAL COMPONENT AND CORRESPONDING BATTERY COMPARTMENT

(71) Applicant: Jiankun Hu, Guangdong (CN)

(72) Inventor: Jiankun Hu, Guangdong (CN)

( * ) Notice: Subject to any disclaimer, the term of this patent is extended or adjusted under 35 U.S.C. 154(b) by 274 days.

(21) Appl. No.: 13/980,247

(22) PCT Filed: Dec. 4, 2012

(86) PCT No.: PCT/CN2012/085846
§ 371 (c)(1),
(2) Date: Aug. 5, 2013

(87) PCT Pub. No.: WO2013/083029
PCT Pub. Date: Jun. 13, 2013

(65) Prior Publication Data
US 2014/0050960 A1    Feb. 20, 2014

(30) Foreign Application Priority Data
Dec. 4, 2011    (CN) .......................... 2011 1 0396384

(51) Int. Cl.
*H01M 2/20* (2006.01)
*H01M 2/10* (2006.01)
*H01M 2/30* (2006.01)
*H01M 10/04* (2006.01)
*H01M 2/02* (2006.01)

(52) U.S. Cl.
CPC ............ *H01M 2/204* (2013.01); *H01M 2/0217* (2013.01); *H01M 2/105* (2013.01); *H01M 2/1033* (2013.01); *H01M 2/1061* (2013.01); *H01M 2/30* (2013.01); *H01M 10/0436* (2013.01)

(58) Field of Classification Search
CPC .. H01M 2/021; H01M 2/0217; H01M 2/0227
See application file for complete search history.

(56) References Cited

U.S. PATENT DOCUMENTS 1,627,264 A * 5/1927 Baird ............................ 429/99

FOREIGN PATENT DOCUMENTS

| CN | 2691072 Y | 4/2005 |
|---|---|---|
| CN | 101222076 A | 7/2008 |
| CN | 201122618 Y | 9/2008 |
| CN | 102005793 A | 4/2011 |
| CN | 102231432 A | 11/2011 |
| CN | 102522520 A | 6/2012 |
| CN | 102738435 A | 10/2012 |

OTHER PUBLICATIONS

International Search Report for Application No. PCT/CN2012/085846, dated Mar. 7, 2013.

* cited by examiner

*Primary Examiner* — Jane Rhee
(74) *Attorney, Agent, or Firm* — Alston & Bird LLP

(57) ABSTRACT

Rechargeable battery for replacing dry battery and its structural component and corresponding battery compartment are provided, the structural component includes a battery shell for accommodating the electric core of the rechargeable battery, the battery shell has a first end face and a second end face opposed each other, the first end face is provided with a positive electrode and a negative electrode for external power supply, the second end face or the first end face or the side face of the battery shell is provided with a charging port, the positive electrode on the first end face is electrically connected with outwardly projecting elastic conductive structure.

11 Claims, 4 Drawing Sheets

RECHARGEABLE BATTERY FOR REPLACING DRY BATTERY AND ITS STRUCTURAL COMPONENT AND CORRESPONDING BATTERY COMPARTMENT

TECHNICAL FIELD

The present application relates to the field of battery technology, specifically to a rechargeable battery substituted for dry battery, a structural assembly thereof and a corresponding battery compartment.

PRIOR ART

Though standard dry battery is widely used, the environmental pollution and waste of resources induced by which are also more serious. The applicant has proposed two new rechargeable batteries, see Chinese patent application CN102005793A and CN102738435A, in which any one having long service life and less pollution can be substituted for two standard dry batteries. In practical applications, two dry batteries are generally placed side-by-side in a standard battery compartment. To allow the proposed new rechargeable battery easily apply to the currently existing battery compartments which are huge in quantity and suitable for standard dry batteries, it is necessary to design the structure of the new rechargeable battery.

SUMMARY

An embodiment of the present application provides a structural assembly of a rechargeable battery substituted for dry battery, comprising a battery housing for accommodating the rechargeable battery, wherein the battery housing is provided opposite first and second end faces, the first end face is provided with a positive electrode and a negative electrode for power supply outwardly, the second end face or the first end face or a side face of the battery housing is provided with a charging port, the positive electrode electrically is connected to a resilient conductive member extruded outwardly.

An embodiment of the present application provides a rechargeable battery substituted for dry battery, comprising a structural assembly provided herein, as well as a cell accommodated in the battery housing of the structural assembly, with the positive electrode of the cell being electrically connected to the positive electrode of the battery housing, and the negative electrode of the cell being electrically connected to the negative electrode of the battery housing.

An embodiment of the present application provides a battery compartment for accommodating at least two standard dry batteries, wherein the battery compartment is provided with a barrier member positioned between two parallel spaces each formed for placing the dry batteries, the size of the barrier member is adapted to the gap between the dry batteries, the length of the space between the output end of the battery compartment and the barrier member is adapted to the length of the battery housing according to an embodiment, so as to directly accommodate the rechargeable battery adopted the battery housing provided herein.

For the structural assembly and corresponding rechargeable battery according to an embodiment of the present application, through electrically connecting a positive electrode with a resilient conductive member extruded outwardly, the rechargeable battery with positive and negative electrodes thereof located on a same end face can directly form a loop with the output end of the battery compartment (since the existing battery compartment used for accommodating dry battery may be provided with a resilient conductive member at the position connected with a negative electrode, such as a spring or an elastic sheet), thus replacing two standard dry batteries.

For the battery compartment according to an embodiment of the present application, by providing a barrier member, the battery compartment can not only fit for utilizing standard cylindrical battery, but also fit for directly placing the rechargeable battery having the battery housing according to an embodiment, which is easy for users to choose battery to use.

BRIEF DESCRIPTIONS OF THE DRAWINGS

DETAILED DESCRIPTION

The present application shall be described in more detail in the following with reference to embodiments and to the drawings.

Some terms adopted herein may be described firstly.

(1) Standard battery compartment: refers to a capsule in an existing electric appliance for placing two cylindrical batteries side by side, such as two AA dry batteries or two AAA dry batteries.

(2) Series end of the battery compartment: refers to an end at which the connecting point of the positive electrode connecting with the negative electrode is a short circuit; after putting two cylindrical batteries into the battery compartment side by side, each positive electrode of the two cylindrical batteries respectively connects to a corresponding negative electrode in series by the series end of the battery compartment.

(3) Output end of the battery compartment: refers to an end at which the connecting point of the positive electrode connecting with the negative electrode supplies power outwardly; after putting two cylindrical batteries into the battery compartment side by side, the connecting point on the positive electrode of the battery compartment electrically connects to the positive electrode of one cylindrical battery, and the connecting point on the negative electrode of the battery compartment electrically connects to the negative electrode of another cylindrical battery.

First Embodiment

Figure 1:
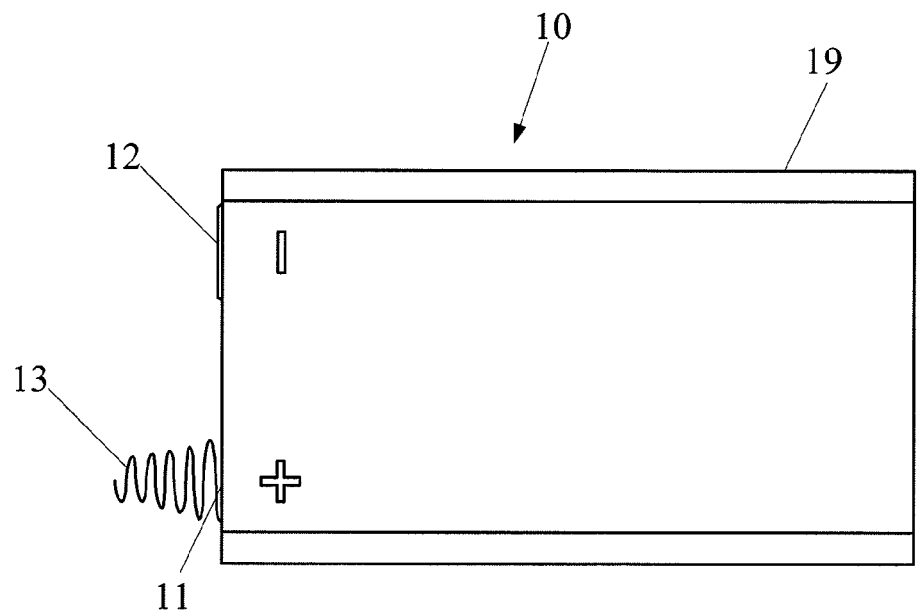
FIG. 1 is a schematically structural view of the structural assembly according to an embodiment of the present application.

As shown in FIG. 1, a structural assembly according to an embodiment of the present application is labeled 10 as a whole. In this embodiment, the structural assembly 10 only includes one component, i.e., a battery housing 19. The battery housing 19 is provided with opposite first and second end face, the first end face is provided with a positive electrode 11 and a negative electrode 12 for power supply outwardly, the second end face is provided with a charging interface, for example, an interface of mini USB or micro USB (not shown herein), the positive electrode 11 is electrically connected to a resilient conductive member 13 extruded outwardly. It is readily understood that the charging interface may also be provided at the first end face or a side face of the battery housing in other embodiments. In this embodiment the resilient conductive member 13 is a spring integrated with the positive electrode 11 as a whole. In other embodiments, the resilient conductive member may utilize various structures and materials, such as elastic metal sheet, or the conductive portion and the resilient portion of the resilient conductive member may also be designed respectively so long as the positive electrode of the battery housing can electrically connect to a corresponding contact point of the battery housing in a scalable manner. It shall be understood that, the battery housing 19 may accommodate battery for power supply, for example, the accommodated battery can be the two rechargeable batteries proposed by the applicant (see Chinese patent application CN102005793A and CN102738435A). In some embodiments, the battery housing 19 may further provide a portion for a status indicator light (not shown herein) and a switch for implementing some further functions (not shown herein).

Second Embodiment

Figure 2:
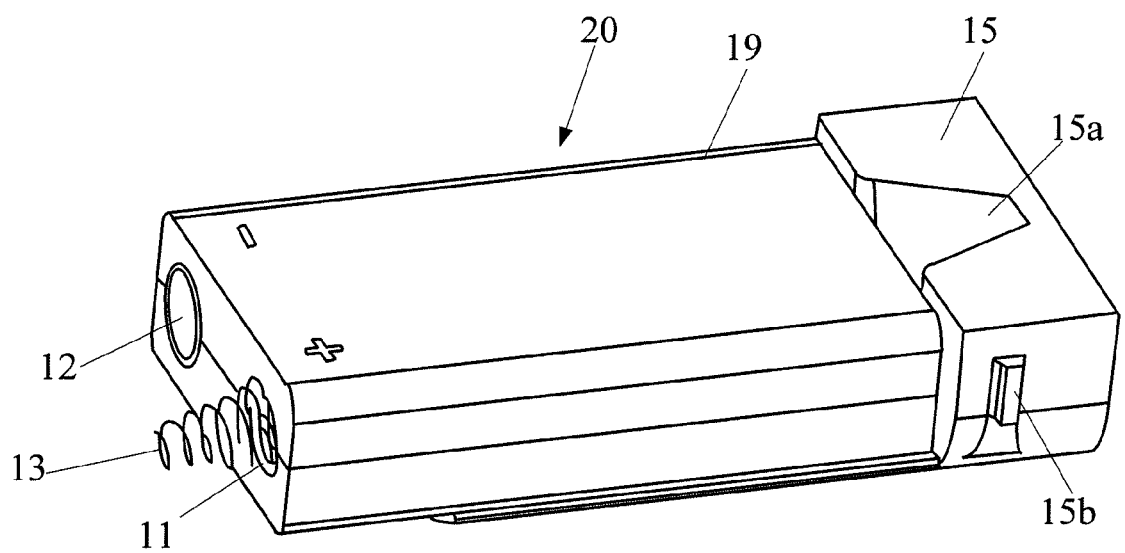
FIG. 2 is a schematically structural view of the structural assembly according to another embodiment of the present application.
Figure 3:
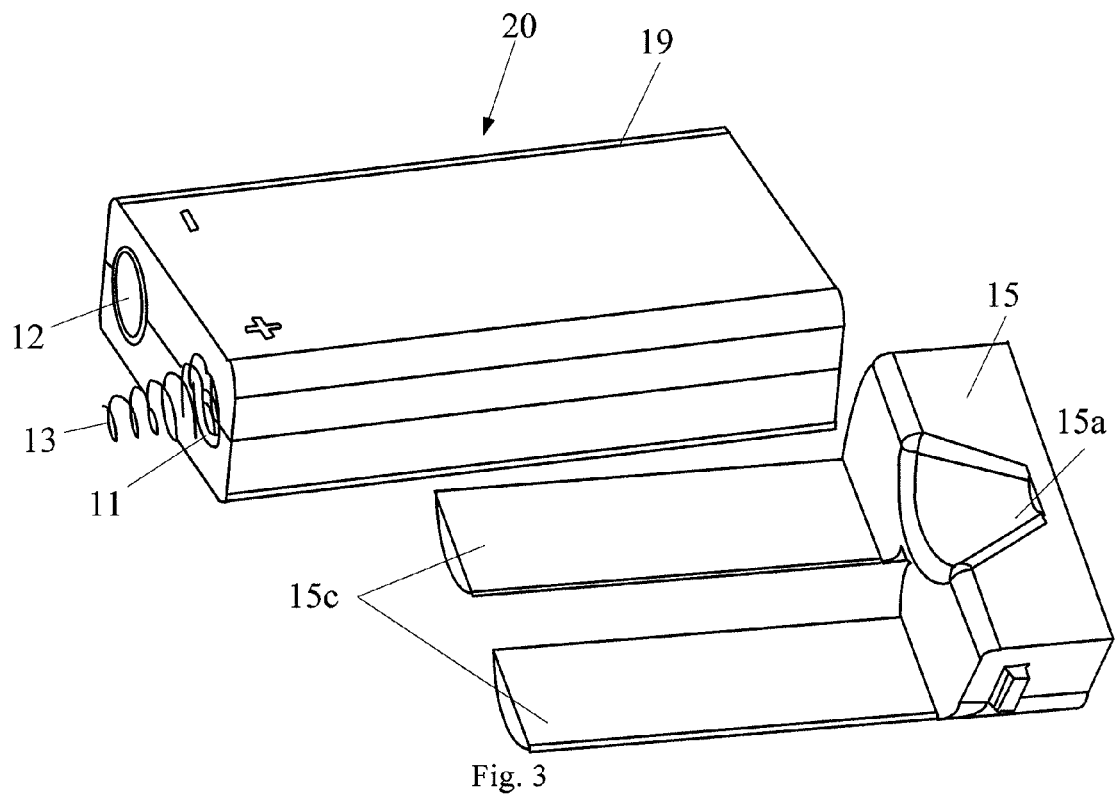
FIG. 3 is a schematically exploded view of the structural assembly shown in FIG. 2.

As shown in FIG. 2 and FIG. 3, a structural assembly according to another embodiment of the present application is labeled 20 as a whole. The difference between this embodiment and the first embodiment is that, the structural assembly 20 comprises two components, i.e., a battery housing 19 and an elongated member 20. The elongated member 15 is provided with a third end face abutted against the second face of the battery housing 19, and is configured for elongating the length of the battery housing 19 so as to match with the dry battery (such as AA or AAA battery) to be replaced. It shall be understood that, when putting the structural assembly 20 into the battery compartment, the elongated 15 is located at the series end of the battery compartment. The battery housing 19 matched with the elongated member 15 can well adapt to an existing standard battery compartment and directly substitute two cylindrical batteries.

Furthermore, in this embodiment, the third end face of the elongated member 15 is provided with a gap 15a; two supporting plates 15b each with an arc-shaped bottom surface and a flat top surface are formed at the bottom of the third end face of the elongated member 15; and a side of the elongated member 15 is provided with a resilient extrusion 15c. The gap 15a makes it easier for users to dig out the battery housing 19 from the battery compartment so as to carry out operations such as replacing or recharging battery. The support plate 15b can make it better to match with the shape of the bottom of the battery compartment, and provide a better support for batter housing 19 so that the battery housing 19 can be placed in the battery compartment more stable. The resilient extrusion 15c causes the side of the elongated member 15 have certain friction with the side wall of the battery compartment, when digging out the battery housing 19 from the battery compartment, the elongated member 15 can relatively stay in the battery compartment, which allows the battery compartment to be used continuously without the series end of the battery compartment to be determined again. In other embodiments, such auxiliary structures can be used selectively or be omitted.

In other embodiments, the end face where the elongated member abutted against the series end of the battery compartment may also provided with a groove (not shown herein), a spring of the negative electrode at the series end of the battery compartment can correspondingly insert into the groove so that the elongated member is easy to be placed. Certainly, the groove may also not be provided, which makes the spring of the negative electrode stay in a compressed state.

Third Embodiment

Figure 4:
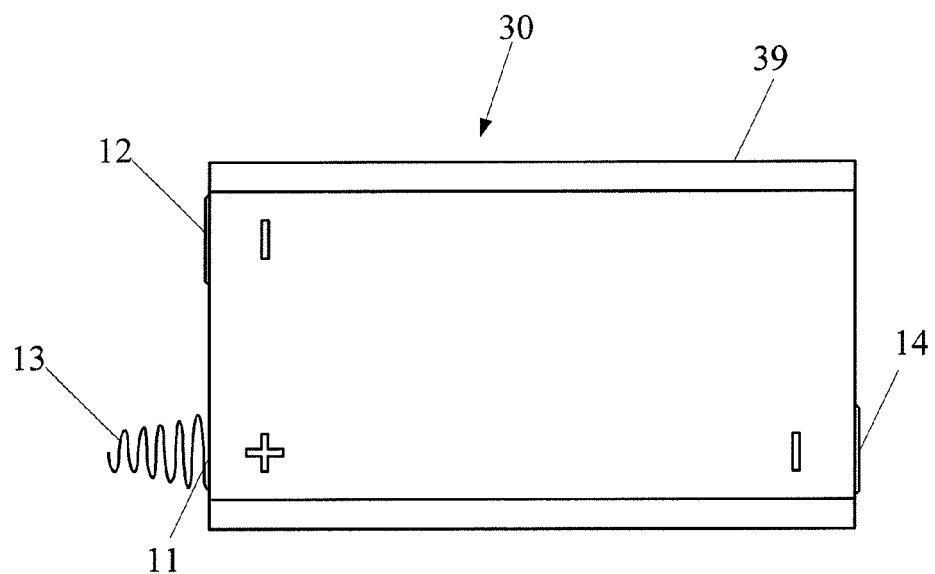
FIG. 4 is a schematically structural view of the structural assembly according to another embodiment of the present application.

As shown in FIG. 4, a structural assembly according to another embodiment of the present application is labeled 30 as a whole. In this embodiment, the structural assembly 30 only includes one component, i.e., a battery housing 39. The difference between this embodiment and the first embodiment is that, the second end face is further provided with a second negative electrode 14 having an identical function as the negative electrode 12 on the first end face. Upon request, the positive electrode 11 and the negative electrode 12, or the positive electrode 11 and the second negative electrode 14, may be selected to supply power. The second negative electrode may be implemented simply by electrically connecting the negative electrode 12 to the position where the second negative electrode 14 located. Generally, the second negative electrode 14 and the positive electrode 11 are in a same axis.

Fourth Embodiment

Figure 5:
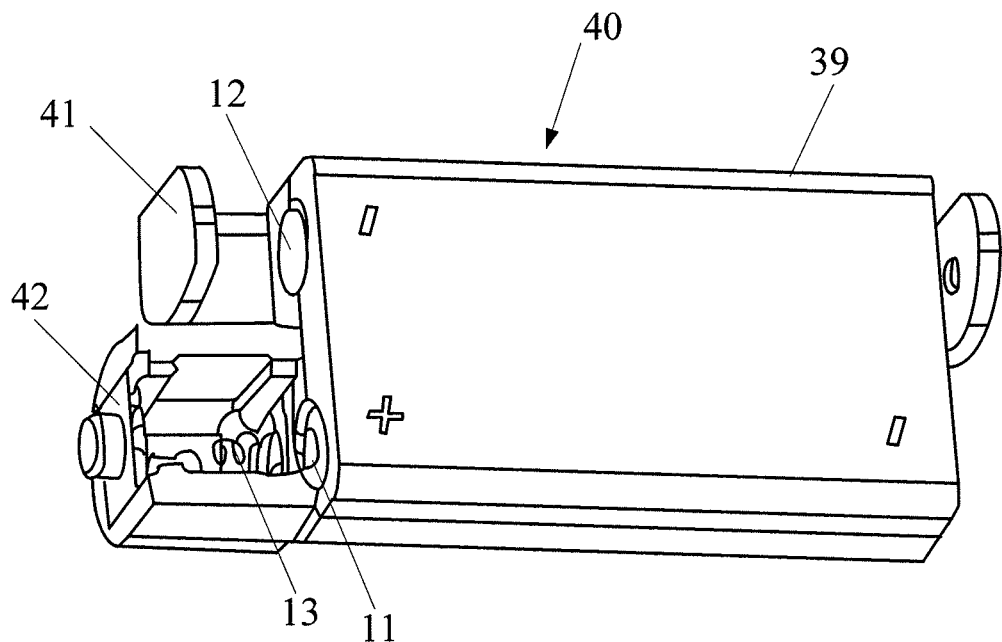
FIG. 5 is a schematically structural view of the structural assembly according to another embodiment of the present application.
Figure 6:
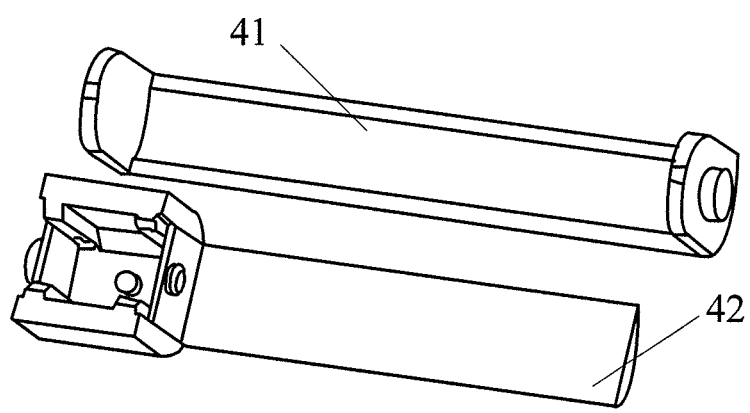
FIG. 6 is a schematically structural view of the short-circuit member and the output member of the structural assembly shown in FIG. 5.

As shown in FIG. 5 and FIG. 6, a structural assembly according to another embodiment of the present application is labeled 40 as a whole. The difference between this embodiment and the third embodiment is that, the structural assembly 40 comprises three components, i.e., a battery housing 39, a short-circuit member 41 and an output member 42. The size of the short-circuit member 41 and the output member 42 shall be adapt to the size of the battery compartment adopted the structural assembly 40. The short-circuit member 41, which is in a same axis with the negative electrode 12, is configured for allowing a short circuit occur when the negative electrode at the output end of the battery compartment is connected to the positive electrode at the series end. The output member 42 and the second negative electrode 14 (not shown in FIG. 5) are in a same axis, and one end of the output member 42 is electrically connected to the positive electrode 11, so that the positive electrode 11 is electrically connected to the positive electrode on the output end of the battery compartment to fit the existing standard battery compartment.

Fifth Embodiment

A rechargeable battery substituted for dry battery according to an embodiment of the present application may comprises a structural assembly 10 described in the first embodiment, that is, a battery housing 19, and a cell accommodated in the battery housing 19, where the positive electrode of the cell is electrically connected to the positive electrode of the battery housing, and the negative electrode of the cell is electrically connected to the negative electrode of the battery housing. It can be readily understood that, the electric connection between the cell and the battery housing may adopt various feasible manner, such as printed circuit boards, wires, a variety of electronic components, etc. In other embodiments, the rechargeable battery may also adopt the structural assembly described in the second, third and fourth embodiments.

A standard battery compartment can accommodated the rechargeable battery having a structural assembly described in the second embodiment or the fourth embodiment instead of existing two standard cylindrical battery, so that an existing electric appliance may easily uses the rechargeable battery described herein, which can achieve the purposes of reducing environmental pollution and avoiding waste of resources.

Sixth Embodiment

Figure 7:
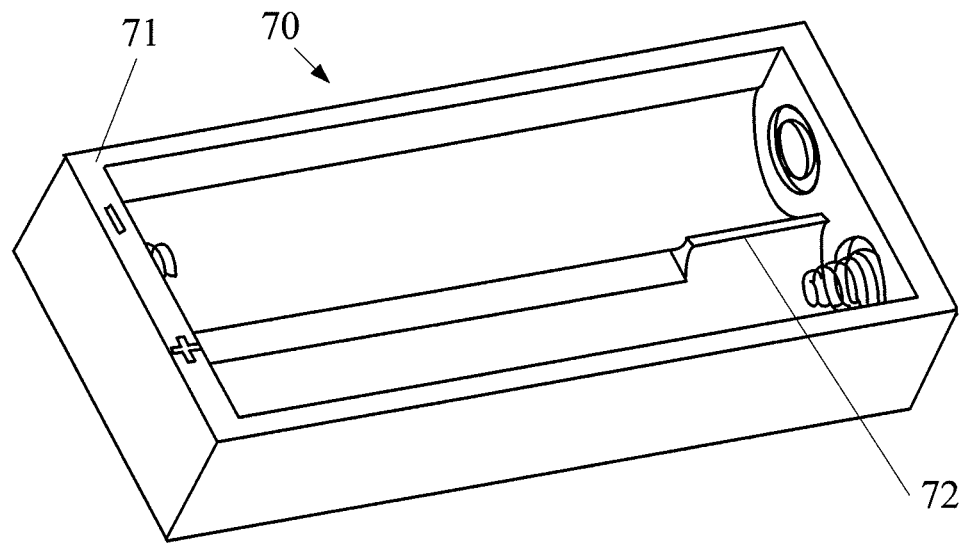
FIG. 7 is a schematically structural view of the battery compartment according to the present application.
Figure 8:
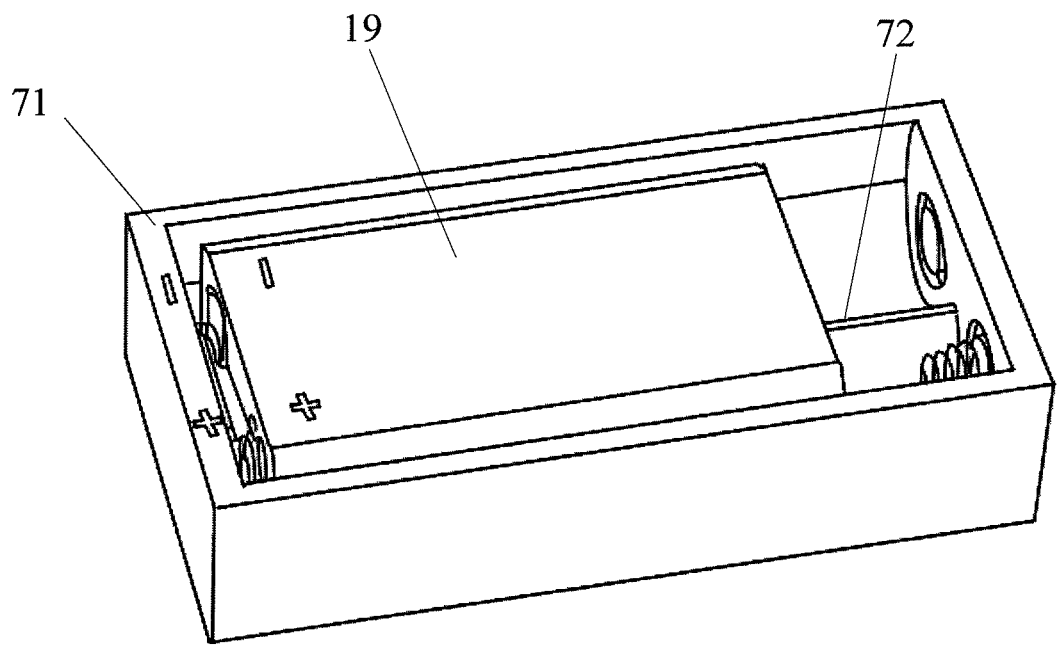
FIG. 8 is a schematically structural view of the battery compartment shown in FIG. 7 assembled with a battery.

As shown in FIG. 7 and FIG. 8, a battery compartment according to an embodiment of the present application is labeled 70 as a whole. The battery compartment 70 is generally provided in an electronic product for accommodating at least two standard dry batteries. The battery compartment is provided with a barrier member 72 positioned between two parallel spaces each formed for placing the dry batteries, the size of the barrier member 72 is adapted to the gap between the dry batteries, the length of the space between the output end 71 of the battery compartment 70 and the barrier member 72 is adapted to the length of the battery housing 19 in the first embodiment so as to directly accommodate the rechargeable battery adopted the battery housing 19 in the first embodiment. In this embodiment, the barrier member is extended from the series end of the battery compartment. It is readily to be understood that, in other embodiments, the barrier housing may also have other structures and shapes, for example, an extrusion at a blocking position, as long as the barrier member do not get in the way when loading cylindrical battery, as well as relatively fixing the position of the battery housing 19.

The battery compartment according to an embodiment of the present application can not only fit for placing two standard cylindrical batteries side by side, but also fit for directly placing the rechargeable battery having the battery housing described in the first embodiment, in addition, it is possible to further save resources by eliminating the elongated member described in the second embodiment, and the series end of the battery compartment may not need to be determined, which facilitates users.

It shall be understood that, the embodiments set forth herein serve only to help to understand the present application, and shall not be construed as limitation of the present application. Modifications of the foregoing embodiments will come to mind to one skilled in the art based on the thoughts of the present application.

What is claimed is:

1. A structural assembly of a rechargeable battery configured to be substituted for one or more dry batteries, comprising a battery housing for accommodating the rechargeable battery, wherein the battery housing is provided with opposite first and second end faces, the first end face is provided with a positive electrode and a negative electrode for power supply outwardly, the second end face or the first end face or a side face of the battery housing is provided with a charging interface, the positive electrode electrically is connected to a resilient conductive member extruded outwardly, further comprising an elongated member having a third end face abutted against the second face of the battery housing for elongating the length of the battery housing so as to match with the dry batteries to be replaced.

2. The structural assembly in accordance with claim 1, wherein the third end face of the elongated member is provided with a gap.

3. The structural assembly in accordance with claim 2, wherein a side of the elongated member is provided with a resilient extrusion.

4. The structural assembly in accordance with claim 1, wherein the second end face is further provided with a second negative electrode having an identical function as the negative electrode on the first end face.

5. The structural assembly in accordance with claim 1, wherein the resilient conductive member is a spring integrated with the positive electrode as a whole.

6. A battery compartment provided by an electronic product for accommodating two standard dry batteries, comprising a barrier member positioned between two parallel spaces each formed for placing one dry battery, the size of the barrier member is adapted to the gap between the dry batteries, the length of the space between the output end of the battery compartment and the barrier member is shorter than length of the dry batteries and is adapted to a length of a battery housing of a structural assembly for a rechargeable battery to be substituted for the dry batteries, wherein the structural assembly comprises the battery housing for accommodating the rechargeable battery, wherein the battery housing is provided with opposite first and second end faces, the first end face is provided with a positive electrode and a negative electrode for power supply outwardly, the second end face or the first end face or a side face of the battery housing is provided with a charging interface, the positive electrode electrically is connected to a resilient conductive member extruded outwardly.

7. A rechargeable battery configured to be substituted for one or more dry batteries, comprising:
   a structural assembly comprising a battery housing, wherein the battery housing is provided with opposite first and second end faces, the first end face is provided with a positive electrode and a negative electrode for power supply outwardly, the second end face or the first end face or a side face of the battery housing is provided with a charging interface, the positive electrode electrically is connected to a resilient conductive member extruded outwardly; and
   a cell disposed in the battery housing of the structural assembly, with the positive electrode of the cell being electrically connected to the positive electrode of the battery housing, and the negative electrode of the cell being electrically connected to the negative electrode of the battery housing,
   wherein the structural assembly further comprises an elongated member having a third end face abutted against the second face of the battery housing for elongating the length of the battery housing so as to match with the dry batteries to be replaced.

8. The rechargeable battery of claim 7, wherein the third end face of the elongated member of the structural assembly is provided with a gap.

9. The rechargeable battery of claim 8, wherein a side of the elongated member of the structural assembly is provided with a resilient extrusion.

10. The rechargeable battery of claim 7, wherein the second end face is further provided with a second negative electrode having an identical function as the negative electrode on the first end face.

11. The rechargeable battery of claim 7, wherein the resilient conductive member is a spring integrated with the positive electrode as a whole.

* * * * *